Oct. 30, 1951     A. C. HALLBERG     2,572,856
AUTOMATIC ELECTRIC CORD TENSIONER
Filed July 31, 1945
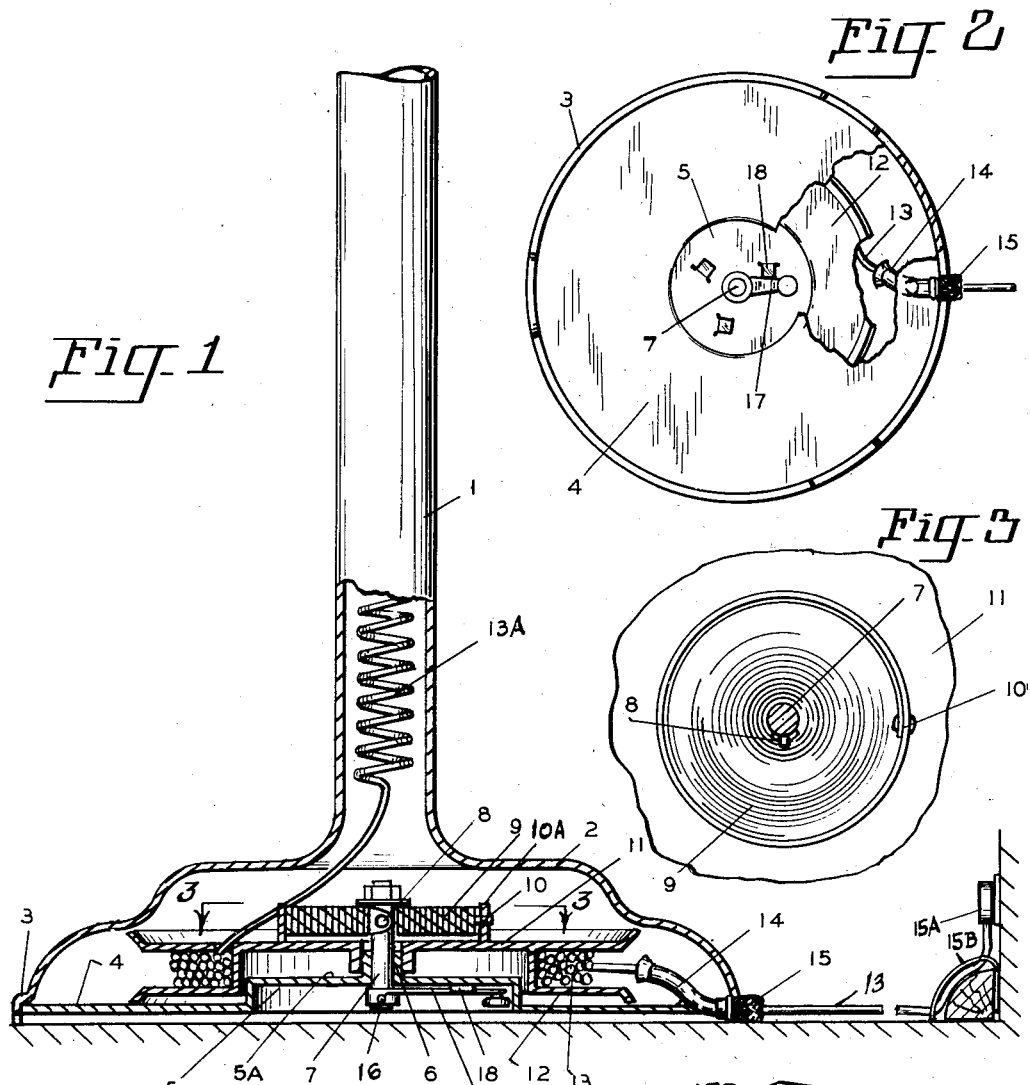
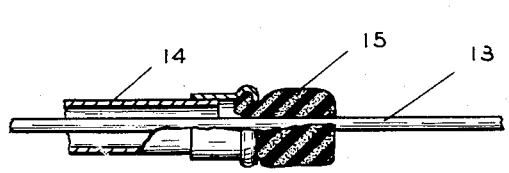
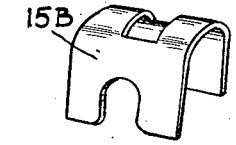
INVENTOR.
ALFRED C. HALLBERG
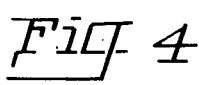

Patented Oct. 30, 1951

2,572,856

UNITED STATES PATENT OFFICE 2,572,856

AUTOMATIC ELECTRIC CORD TENSIONER

Alfred C. Hallberg, Portland, Oreg.

Application July 31, 1945, Serial No. 607,995

1 Claim. (Cl. 242—107)

This invention relates to improvements in reels adapted to automatically rewind electric cords as applied to floor lamps, table lamps or other portable electrical appliances such as vacuum cleaners, electric shavers, and the like, and to keep the cord taut between the electrical fixtures and the source of electrical energy into which one end of the cord is plugged. For example, in moving a floor lamp away from a wall plug, the reel will pay out the cord and cause it to lie flat upon the floor between the plug and the lamp. When the lamp is moved back toward the wall, the reel will automatically wind up the cord.

A further object of the invention is the provision of means for selectively regulating the amount of tension of the coil spring used to rotate the reel. This application contains subject matter partly disclosed in my application covering Automatic Electric Cord Tensioners, filed September 22, 1943, under Serial No. 503,433 now abandoned.

The foregoing and other objects will appear as my invention is more fully hereinafter described in the following specification, illustrated in the accompanying drawings, and finally pointed out in the appended claim:

In the drawing:

Figure 1 is a fragmentary sectional side elevation of a lamp standard showing my invention applied to and disposed in its base.

Figure 2 is a slightly reduced bottom plan view of Figure 1 with fragments broken away for convenience of illustration.

Figure 3 is a sectional plan view taken on the line 3—3 of Figure 1.

Figure 4 is an enlarged fragmentary sectional detail view of means for sealing the cord outlet aperture in the base.

Figure 5 is a detail perspective view of a clamp for attaching the lamp cord to the floor molding below the electric wall plug.

Referring now more particularly to the drawing.

Reference numeral 1 indicates a lamp standard which may be formed integral with or removably attached to a hollow base 2 which is shouldered as at 3 around its periphery to receive a sealing disc 4. The center of the disc is formed into a cavity 5 to provide a platform 5A formed with a vertical bearing 6 to rotatably receive a shaft 7 to which is attached as at 8 a coil spring 9. The opposite end of the coil spring is anchored as at 10 to a flanged portion 10A of the upper flange 11 of a reel 12 around which is wound the lamp cord 13. That portion of the cord which extends up through the lamp standard 1 to the fixture carried by it is loosely spiralled as indicated at 13A to prevent twisting of the cord during operation of the reel. The other end of the cord extends through a tube 14 leading to an aperture through the base 2 which is sealed by an apertured plug 15 made of soft sponge rubber, or the like, to allow passage of the cord into and out of the base. The diameter of the cord is greater than the diameter of the aperture in the plug to prevent the entrance of dust into the base. The outermost end of the cord terminates in a conventional plug 15A and the cord is secured to the floor molding by means of a clamp 15B preferably disposed below the plug to prevent it from being removed when tension is applied to the cord by movement of the lamp, or other fixture, away from the plug.

To the lower end of the shaft 7, I attach by any suitable means, such, for instance, as the pin 16, a handle 17 adapted to rotate the shaft in either direction for increasing or decreasing the amount of tension applied to the coil spring 9. The handle may be locked in any of its adjusted positions by contacting any of the abutments 18 punched out of the top wall of the cavity 5.

If the lamp, or the fixture, is to be moved a considerable distance from the plug, the spring should be under light tension to permit of maximum rotation of the reel before the spring becomes tightly wound. If the fixture is to be moved only a short distance from the plug more tension should be applied to the spring to keep the cord taut between the fixture and the plug.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A lamp support consisting of a hollow base, a platform disposed within the base and forming a seal therefor, a vertical shaft rotatably mounted through the platform, a reel rotatably mounted on said shaft, an aperture formed through the wall of the base, an apertured spong rubber plug secured within said aperture, a cord of greater diameter than the aperture in said plug wound about said reel and extending out through said apertured plug and terminating in an electric plug connection, a coil spring having one of its ends secured to the shaft and its opposite end secured to the reel, means for rotating said shaft independently of the reel for increasing or decreasing the tension of said spring, means formed on the underside of the platform for locking the shaft turning means in any of its tension applying positions.

ALFRED C. HALLBERG.

REFERENCES CITED

The following references are of record in the file of this patent:

UNITED STATES PATENTS

| Number | Name | Date |
|---|---|---|
| 488,298 | Welsh | Dec. 20, 1898 |
| 1,485,634 | Shillman | Mar. 4, 1924 |
| 1,643,725 | Price | Sept. 27, 1927 |
| 1,654,424 | Mahaffey | Dec. 27, 1927 |
| 2,141,909 | Hauser | Dec. 27, 1938 |